United States Patent
Kreiling

(10) Patent No.: US 8,162,378 B2
(45) Date of Patent: Apr. 24, 2012

(54) MOTOR VEHICLE WITH AN AT LEAST PARTLY MOBILE ROOF

(75) Inventor: Nils Kreiling, Osnabruck (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 723 days.

(21) Appl. No.: 11/815,941

(22) PCT Filed: Feb. 2, 2006

(86) PCT No.: PCT/DE2006/000155
§ 371 (c)(1),
(2), (4) Date: Feb. 3, 2009

(87) PCT Pub. No.: WO2006/084433
PCT Pub. Date: Aug. 17, 2006

(65) Prior Publication Data
US 2011/0127758 A1 Jun. 2, 2011

(30) Foreign Application Priority Data
Feb. 12, 2005 (DE) .......................... 10 2005 006 435

(51) Int. Cl.
B60R 7/00 (2006.01)
(52) U.S. Cl. .......... 296/107.15; 296/107.17; 296/107.09
(58) Field of Classification Search ............. 296/107.01, 296/107.03, 107.15, 107.17, 107.16, 108
See application file for complete search history.

(56) References Cited

U.S. PATENT DOCUMENTS

| 3,271,067 A | 9/1966 | Rollman |
| 6,290,281 B1 | 9/2001 | Durrani et al. |
| 6,312,041 B1 | 11/2001 | Queveau et al. |
| 6,588,824 B2 | 7/2003 | Neubrand |
| 6,866,322 B2 * | 3/2005 | Willard .................... 296/107.01 |
| 6,866,334 B2 | 3/2005 | Leenders |
| 2005/0280280 A1 * | 12/2005 | Heselhaus ................ 296/107.15 |

FOREIGN PATENT DOCUMENTS

| DE | 1945559 | 3/1971 |
| DE | 10317832 | 11/2004 |
| DE | 102004002819 | 8/2005 |
| EP | 1234702 | 8/2002 |
| EP | 1285795 | 2/2003 |
| EP | 1588881 | 10/2005 |
| EP | 1744919 | 1/2007 |

* cited by examiner

*Primary Examiner* — Joseph Pape
(74) *Attorney, Agent, or Firm* — Gifford, Krass Sprinkle, Anderson & Citkowski, P.C.; Douglas L. Wathen

(57) ABSTRACT

The invention relates to a motor vehicle with a roof, comprising a moving flexible roof region, provided with a cover, embodied such that the roof comprises a further roof region separate from the flexible region and divided into rigid roof sections, whereby in the fully open roof position the flexible roof region lies below a rigid roof section extending over the same in the form of a cover.

11 Claims, 5 Drawing Sheets

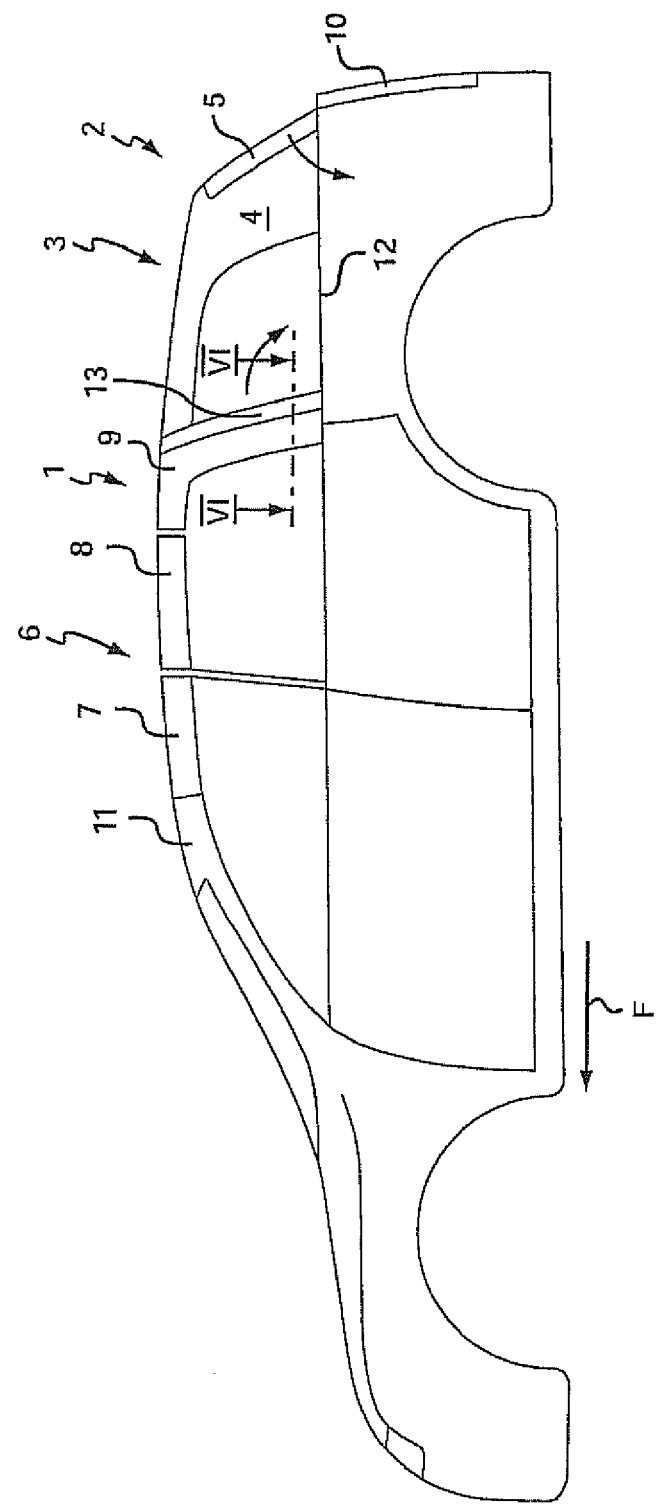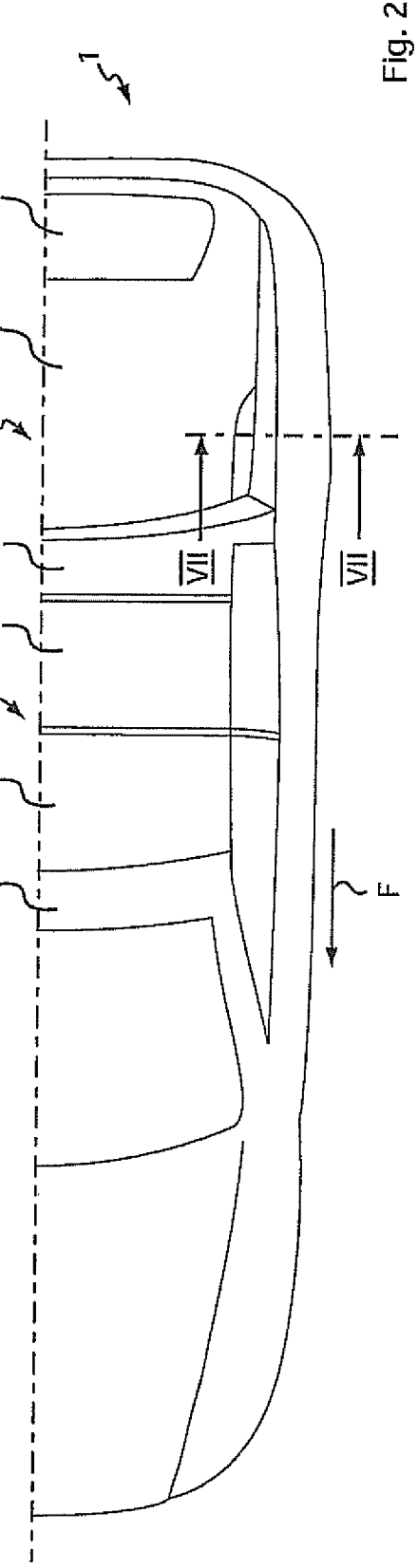

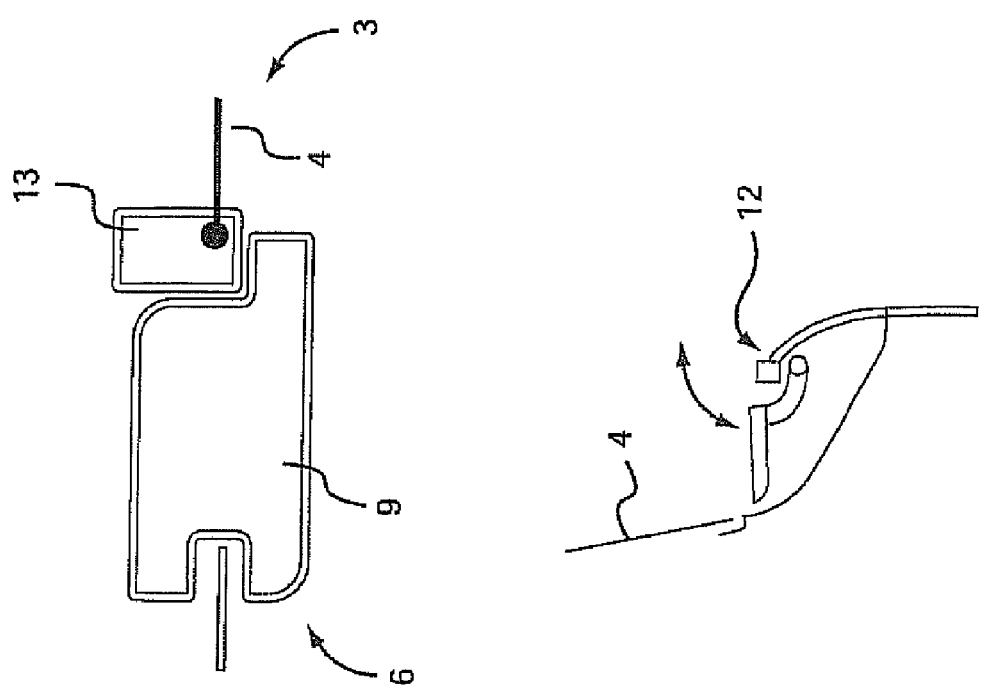

US 8,162,378 B2

MOTOR VEHICLE WITH AN AT LEAST PARTLY MOBILE ROOF

REFERENCE TO RELATED APPLICATIONS

This application is the United States national phase application of PCT/DE2006/000155, filed Feb. 2, 2006, which claims priority to German Patent Application No. DE102005006435.3, filed Feb. 12, 2005, the entire content of each application is incorporated herein by reference.

FIELD OF THE INVENTION

The invention relates generally to a motor vehicle with a roof which is at least partly movable having at least three roof parts and an independently movable roof region.

BACKGROUND OF THE INVENTION

In order to allow partial roof opening for a motor vehicles with two or more rows of seats, such as sports utility vehicles (SUVs), it is known to have at least three rigid roof parts which are sequential with a closed roof as well as roofs having a flexible region covered with a covering.

It is the underlying problem of the invention to store the roof parts in their open position in as space-saving a way as possible in a generic motor vehicle.

SUMMARY OF THE INVENTION

According to one aspect of the invention, a roof opening is made possible for a vehicle having a flexible roof region, wherein the flexible roof region is covered upwardly in its open position without a separate lid part being required therefor. Since the covering is formed by parts of the actual roof, the vertical extent of the stowed roof packet is low so that the space utilization is improved.

According to another aspect of the invention, a vehicle has at least three roof parts which are capable of opening and which are separate from one another at their outer surface, with an additional flexible roof region also being provided. Since the covering roof parts are disposed sequentially flush in the open position, they can cover a long surface and moreover only require a minimized height.

if an almost vertical trunk lid advantageously adjoins the roof part or parts disposed in the manner of a lid toward the rear, the trunk lid, together with the upwardly covering plate part or parts of the roof, can tightly border a trunk, in particular when the covering roof part or parts completely covers or cover the roof region disposed below with an open roof.

With a closed roof, the rear portion of the vehicle can have a side profile similar to a station wagon. With a completely open roof, it can have a side profile similar to a notchback vehicle. Therefore, with a closed roof, an upward enlarging of the trunk is possible and the invention can be utilized for station wagons, vans or SUVs.

Provided that the vehicle has a flexible roof region and a roof region separately connected to the car body with rigid roof parts, a roof position can advantageously be made possible in which only a rear, flexible roof region provided with a covering is open and the roof region disposed to the front and including rigid roof parts is still disposed above the passenger compartment. The movements of the roof regions can then be made possible via transmissions which are also spatially separate and which each only take up a small constructional space.

An additional partial opening in the manner of a sliding roof is possible if roof parts disposed horizontally can be transposed over one another during travel in the closed state.

The vehicle in accordance with the invention can be a full drop-top vehicle for a particularly good open air feeling. Alternatively, it is also possible that frame parts remain in position, for example above lateral window panes.

The separate connection of the roof region disposed at the front can be realized visually and mechanically favorably with rigid roof parts when the roof region has a pillar part projecting upward from a window beltline and with at least one plate part attached to the pillar part. The pillar part can in particular act in the manner of a pivot lever for the plate part or parts disposed at the front of the movable roof region and can also include a rollover protection.

BRIEF DESCRIPTION OF THE DRAWINGS

FIG. 1 is a schematic side view of a vehicle in accordance with the invention in a four-door configuration having a flexible roof region disposed at the rear and a roof region disposed further to the front with respect to the direction of travel and having rigid roof parts with a closed roof;

FIG. 2 shows the vehicle in accordance with FIG. 1 in a view from above cut away at the vertical longitudinal center plane;

FIG. 6 shows a section along the line VI-VI in FIG. 1; and

FIG. 7 shows a section along the line VII-VII in FIG. 2.

DETAILED DESCRIPTION OF THE INVENTION

Figure 3:
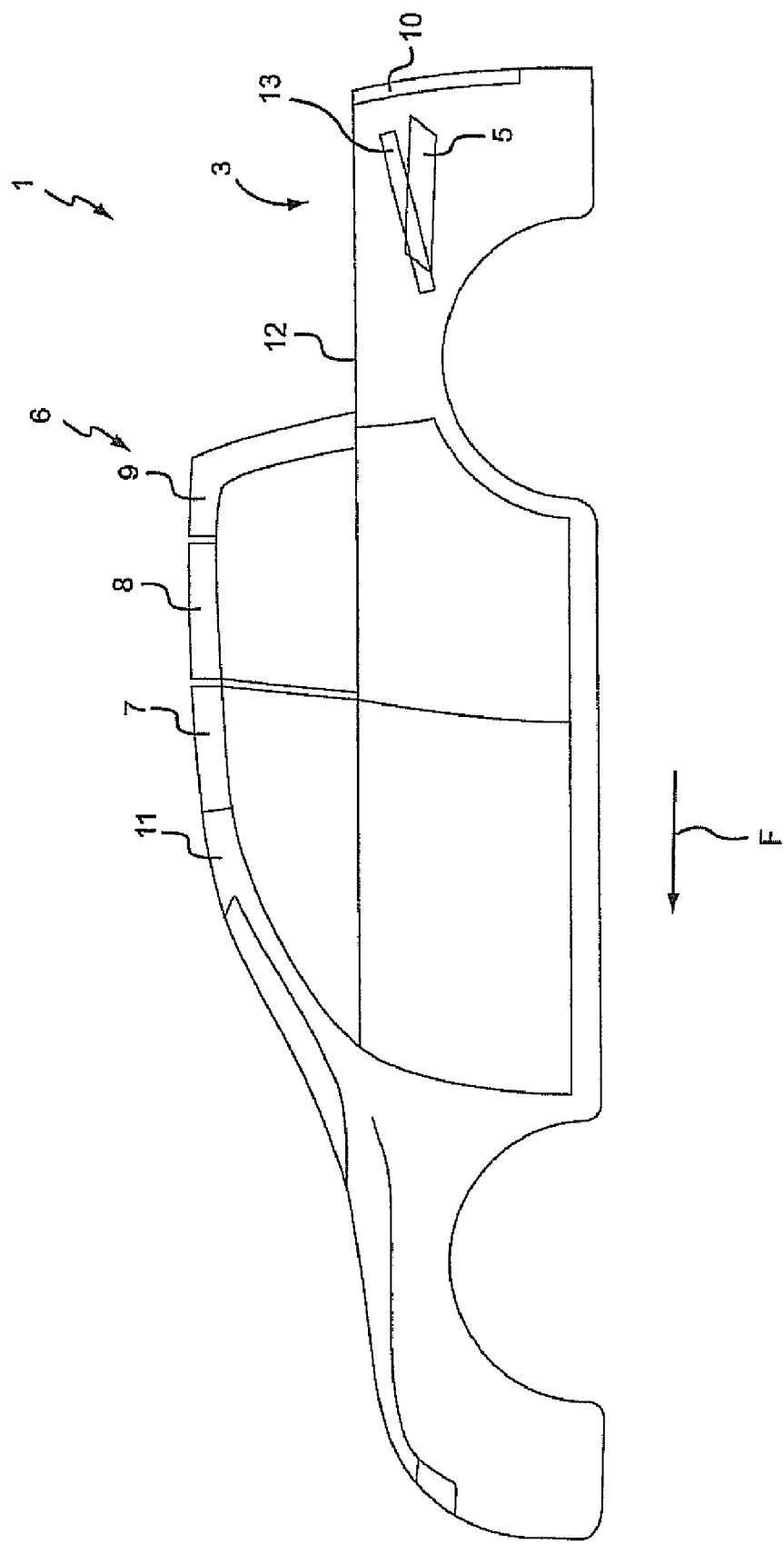
FIG. 3 is a similar view to FIG. 1 after opening the flexible rear roof part.

In FIGS. 1-5, a motor vehicle according to one embodiment is indicated at 1. The vehicle 1 is shown illustratively as a four-door, notchback configuration, though other configurations may be used.

The vehicle 1 includes a flexible rear roof region 3, which is provided with a covering 4 and a rear window 5, and a front roof region 6 here including three rigid roof parts 7, 8, 9. Due to the considerable possible roof length allowed by at least three rigid roof parts 7, 8, 9, which are sequentially aligned in the closed position. The vehicle 1 can provide a large passenger compartment having four or more seats in two or three rows. Both the rear roof region 3 and the front roof region 6 are movably connected to the car body. No manual removal of parts of the roof 2 is therefore necessary for opening the roof.

The front roof region 6 with its roof parts 7, 8, 9, which are substantially rigid, can be made predominantly transparent. Parts respectively covered and forming a rigid frame would also be possible. In every case, the roof parts 7, 8, 9 form units separate from one another at their outer surfaces. The plate parts 7, 8 have practically no arched portion in the longitudinal region of the vehicle and are disposed substantially horizontally over the passenger compartment in their closed position. To affect a partial opening (not shown), at least the first roof part 7 can be transposed above or below the roof part 8 disposed behind it during travel.

In an alternative configuration (not shown), the rear rigid roof part 9 could also include a rear window 5 and form the rear end of the roof without a flexible roof region 3 being provided. The roof line could then also be configured as a notchback vehicle or a pick-up vehicle having a loading space cover with a closed vehicle.

Figure 4:
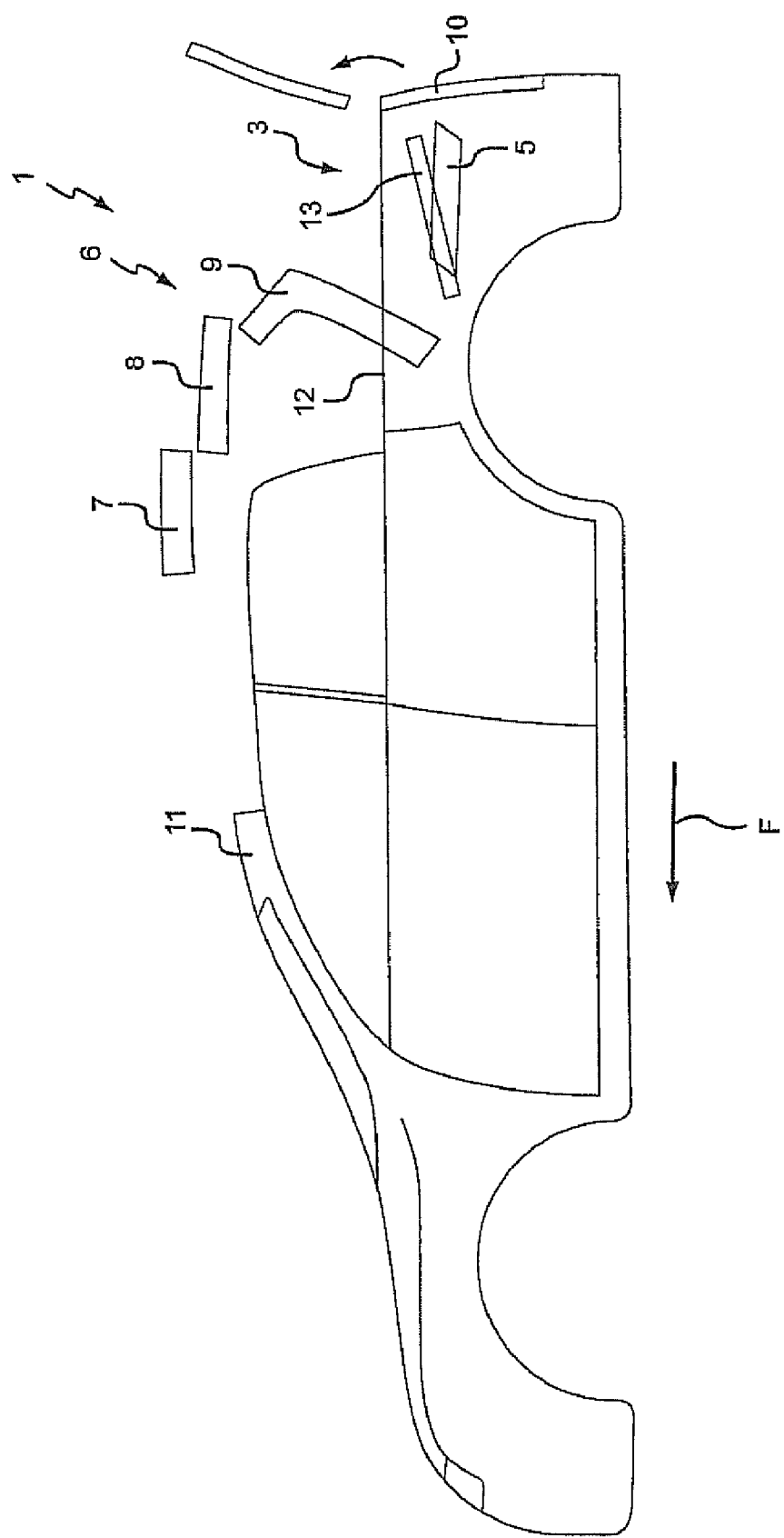
FIG. 4 is a similar view to FIG. 3 during the opening also of the roof region having rigid roof parts and with an additionally indicated pivoting open of the trunk lid.
Figure 5:
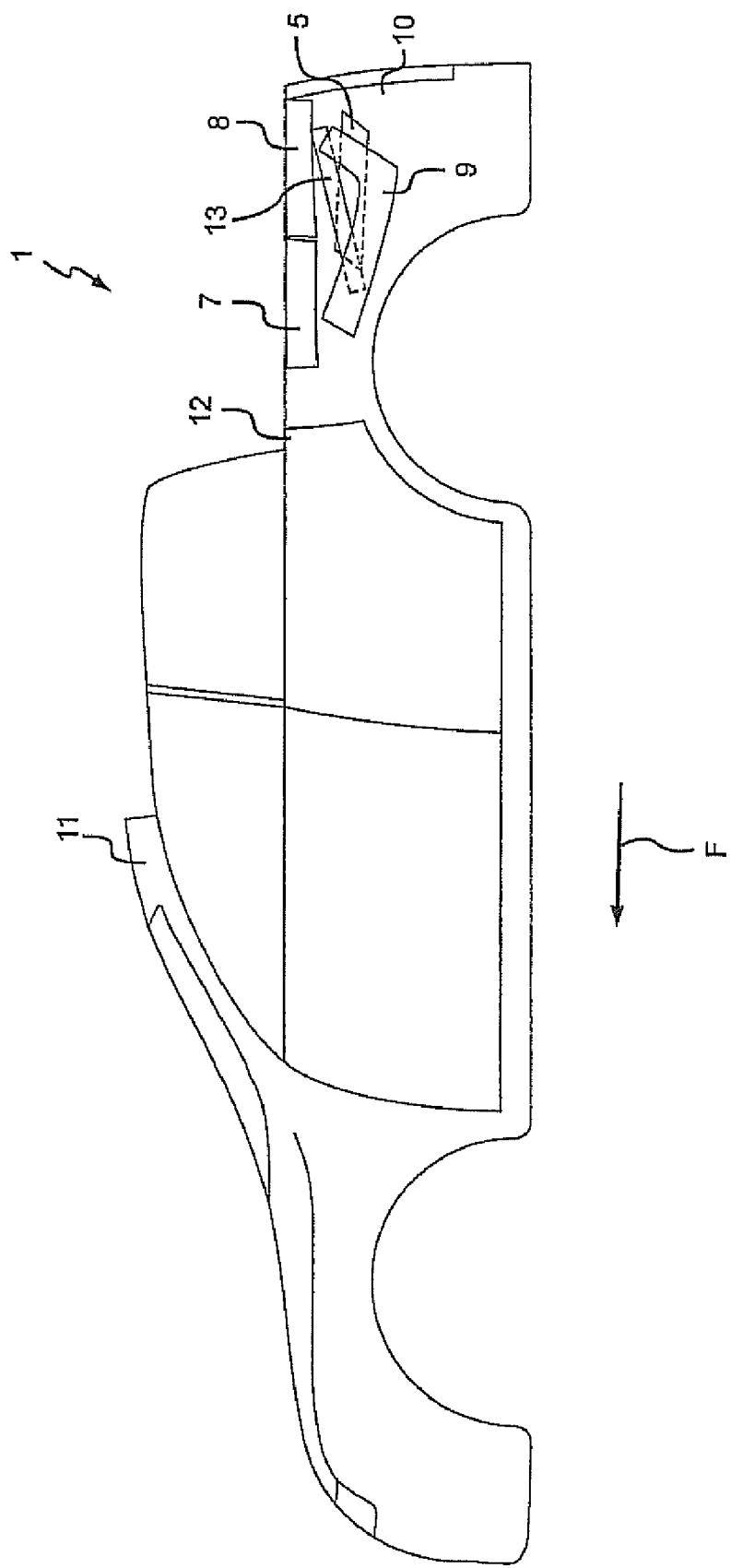
FIG. 5 is a similar view to FIG. 4 with a completely open roof.

A trunk lid 10 is provided at the rear side which is at least almost vertical in the closed state in accordance with the drawing and which is pivotable downwardly or—as shown here in FIG. 4—upwardly.

At the outer surface of the roof, the flexible roof region 3 is completely separate from the roof region 6 including the rigid parts 7, 8, 9 and also has its own drive transmission so that both roof regions 3, 6 are movable separately from each other. The connection of the covering of the rear roof part 3 is shown in FIG. 7. It becomes clear that the covering is fixedly connected peripherally below the window beltline 12 and is therefore automatically tautened by the setting upright of the clamp 13.

The vehicle 1 can allow a roof position in which only the flexible rear roof region 3 is open and is stowed below the window breast line 12, whereas the roof region 6 at the front, in contrast, is disposed closed above the passenger compartment (FIG. 3).

When the front roof region 6 is also completely open, a free position is achieved which extends from the windshield frame 11 up to the trunk lid 10 so that a full drop-top vehicle is provided without any remaining side frame.

The roof region 6 including rigid roof parts 7, 8, 9 has a pillar part 9 which projects upward from the window beltline 12 and at least one plate part 7, 8 disposed at the front is movably hung from the pillar part 9. The pillar part 9 or a linkage covered thereby acts in the manner of a pivot lever for the plate part or parts 7, 8 disposed at the front during the movement of the roof region 6 so that said plate parts are also transposed downwardly by rearward pivoting of the pillar part 9. When the roof 2 is closed (FIG. 1), a clamp 13 of the flexible roof region 3 sealingly abuts the pillar part 9 which can be continued with a cross member extending transversely over the whole vehicle width and can also include a rollover protection (FIG. 6).

To open the roof, the clamp 13 is first released from the contact position and pivoted downwardly, with the rear window 5 being pivoted around a rear fixed connection of the covering of the roof region 3 toward the front so that the flexible roof region 3 is moved into the open position in accordance with FIG. 3. In this position, the rear window 5 is disposed below the clamp 13 and both parts are disposed substantially horizontally in the upper trunk region.

Parallel to this stowing of the rear roof region 3 or after it, the opening of the front roof region 6 can take place in which the plate parts 7, 8 are first opened with respect to one another by a pivoting of the pillar part 9 (FIG. 4) in order also to obtain sufficient headroom for the rear seat passengers as well during the opening. In the open position, in contrast, the plate parts 7, 8 are again generally parallel and sequentially flush in a continuation of the window beltline 12. In this position, they engage over the flexible roof region 3 and also over the pillar part 9 which is likewise disposed substantially horizontally at the end of the opening movement, in the manner of a lid visible from the outside (FIG. 5), without a body lid having to be provided thereover.

The retracted roof parts 9 and 3 are completely covered, with a sealing also being able to be provided at the sides and toward the rear with respect to the trunk lid 10. The sealing permits a completely sealed trunk and folding top reception space thereunder.

With a completely open roof, an elegant side profile in the manner of a notchback vehicle is produced by the horizontal position of the roof parts 7, 8 at the level of the window beltline 12.

The invention has been described in an illustrative manner. It is, therefore, to be understood that the terminology used is intended to be in the nature of words of description rather than of limitation. Many modifications and variations of the invention are possible in light of the above teachings. For example, the roof regions 3, 6 can be able to be moved manually or fully automatically or partially automatically for the movements described. Thus, within the scope of the appended claims, the invention may be practiced other than as specifically described.

The invention claimed is:

1. A motor vehicle comprising:
a roof which is at least partially movable between a closed position extending above a passenger compartment and an open position stowed in a rear region of the motor vehicle, the roof having a flexible roof region with a flexible covering, the roof having a further roof region forwards of and separate from the flexible roof region and including a plurality of substantially rigid roof parts, the flexible roof region being disposed below and covered at least partially by at least one of the substantially rigid roof parts when the roof is in the open roof position.

2. A motor vehicle as set forth in claim 1, wherein, at least two of the rigid roof parts are disposed sequentially and flush with respect to an outer surface of the vehicle in the open position and extend over at least one of the flexible roof region and the other of the rigid roof parts.

3. A motor vehicle as set forth in claim 1, including a substantially vertical trunk lid that adjoins the at least one of the rigid roof parts that covers the flexible roof region in the open position.

4. A motor vehicle as set forth in claim 1, wherein the at least one of the rigid roof parts completely covers the flexible roof region or one of the other of the rigid roof parts disposed thereunder in the open position.

5. A motor vehicle as set forth in claim 1, wherein the motor vehicle has a side profile in the form of a notchback at a rear portion of the motor vehicle when the flexible roof region is in the open position and the further roof region is in the closed position.

6. A motor vehicle as set forth in claim 1, wherein the motor vehicle allows a roof position in which only the flexible roof region is in the open position and the further roof region is in the closed position disposed above the passenger compartment.

7. A motor vehicle as set forth in claim 1, wherein the rigid roof parts are transposed over one another during travel between the open and closed positions.

8. A motor vehicle as set forth in claim 1, wherein the motor vehicle is a full drop-top vehicle.

9. A motor vehicle as set forth in claim 1, wherein the further roof region includes a pillar part which projects upward from a window breast line, at least one of the rigid roof parts being supported by the pillar part.

10. A motor vehicle as set forth in claim 9, wherein the pillar part provides rollover protection.

11. A motor vehicle as set forth in claim 1, wherein the motor vehicle has a side profile in the form of a notchback vehicle or pick-up vehicle at a rear portion of the motor vehicle when the roof is in the open position.

* * * * *